Rohrer & Bassler.
Roasting Ores.

No. 93,643. Patented Aug. 10, 1869.

Witnesses:
H. L. Jones
E. W. B. Phillips

Inventors:
J. M. Rohrer &
J. H. Bassler
Chipman Hosmer & Co. attys

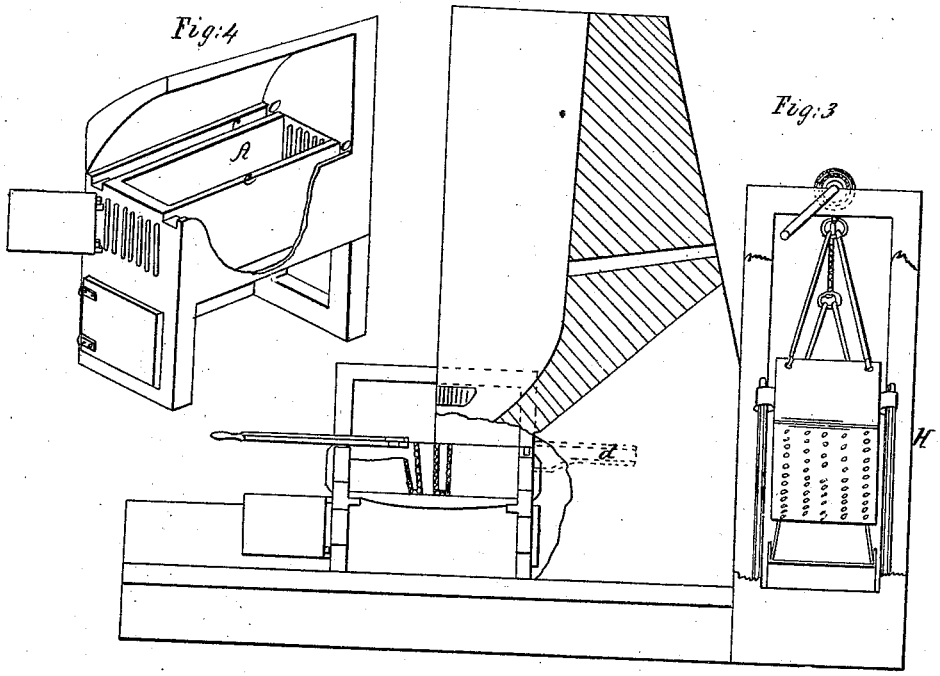
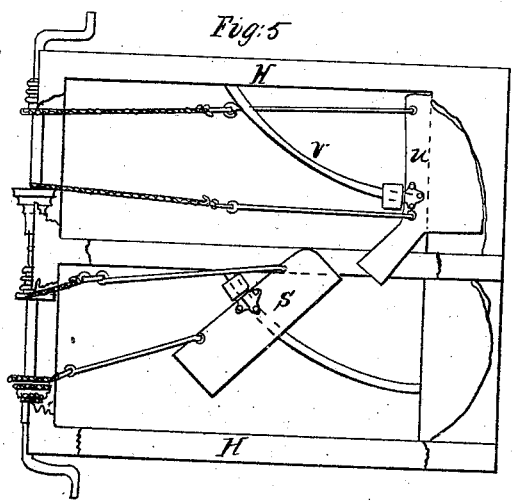

United States Patent Office.

JAMES M. ROHRER AND JOHN H. BASSLER, OF PINE GROVE, PENNSYLVANIA.

Letters Patent No. 93,643, dated August 10, 1869.

IMPROVED KILN FOR ROASTING ORES.

The Schedule referred to in these Letters Patent and making part of the same.

*To all whom it may concern:*

Be it known that we, JAMES M. ROHRER and JOHN H. BASSLER, of Pine Grove, in the county of Schuylkill, and State of Pennsylvania, have invented a new and valuable Improvement in Kilns for the Preparation of Ores for Smelting; and we do hereby declare that the following is a full, clear, and exact description of the construction and operation of the same, reference being had to the annexed drawings, making a part of this specification, and to the letters and figures of reference marked thereon.

Figure 1, of the drawings, is a sectional view;

Figures 3 and 4 are details.

Figure 1:
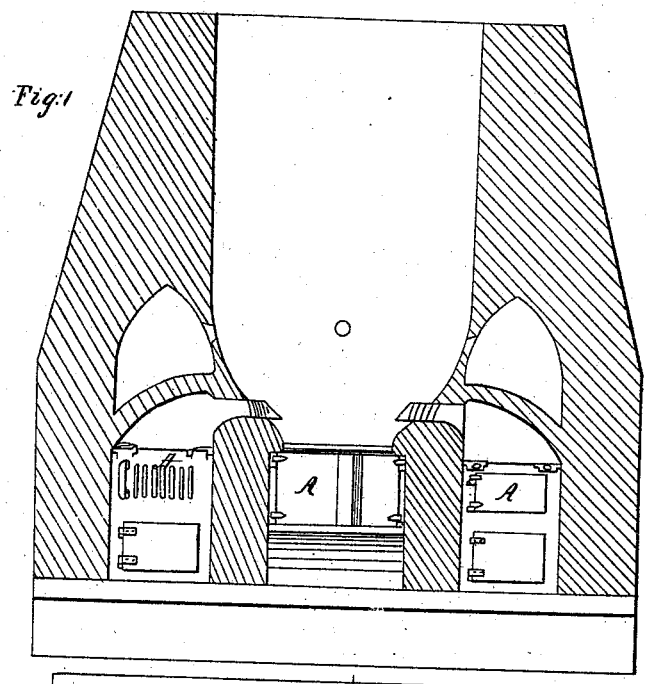
Figure 2:
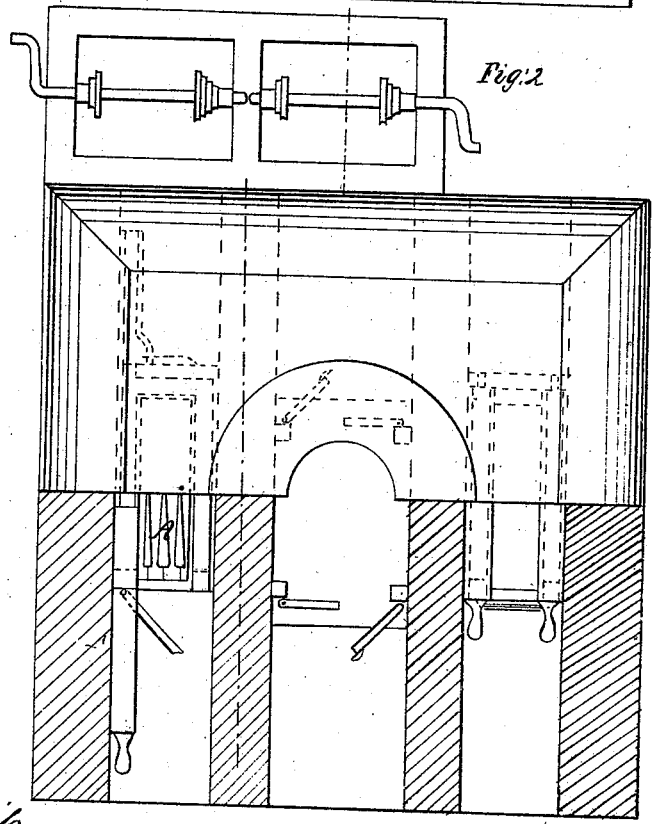
Figure 2 is a front view with the parts removed that are shown on fig. 4.

Our invention relates to the preparation of ores for smelting; and

It consists in providing novel and efficient means for such preparation, whereby the process of smelting may be facilitated and fuel saved.

Our apparatus consists of an ordinary roasting-kiln connected by flues with ovens, marked A on the drawings.

The sides and rear of these ovens, respectively, have attached to them metallic boxes, in which is kept a constant supply of water. These water-boxes are marked c.

The steam from these boxes of water mingles with the hot gases from the fuel, and with them passes along the flues into the kiln, thereby greatly expediting the roasting or oxidizing of the ores, and at the same time keeps the temperature of the kiln within such a range as to prevent the formation of clinkers.

There are waste-pipes leading from these ovens, respectively, one of which is shown on the drawings, marked d, which may be opened or closed at will. When opened they conduct the steam to the open air.

Our apparatus, as will readily be seen, is so constructed that the passages over the ovens, and leading into the kiln, may be opened at pleasure, thereby affording means for examining the interior of the kiln.

Our arrangement shown in front of the kiln, and more particularly set forth on Figure 5, is a device for soaking the ore in salt water, and then coating it with clay.

The letter H represents a frame arranged in front of the kiln, as shown, in the bottom of which are two water-tight boxes, in which we place the lifting-pans u and s, respectively.

The pan u first receives the ore while sitting in its box, which is filled with salt water, or into which salt-water may be poured after the pan is filled with the roasted ore.

When the ore is thus saturated with salt water, it is lifted in the pans by means of the windlass and chains therewith connected, and aided by the curved posts v, to which said pan is attached, as shown, the contents of the pan u are dumped into the pan s.

In this pan we pour a sufficient amount of clay to cover the ore completely, and mix it therewith by suitable means. The result is that the clay adheres to the surface of the ore, and forms a tolerably compact coating therefor.

When this is accomplished, the pan s is raised by its windlass and chains, and dumped into a barrow, to be transported to the furnace.

By the means herein described steam is generated in large quantities, and introduced among the particles of ore in the kiln. The oxygen of this steam, which by weight constitutes about eight-ninths thereof, combines with the ore, and converts it into a peroxide, and the hydrogen unites with the sulphur and phosphorus, and carries off these impurities when present as sulphuretted and phosphoretted-hydrogen gases.

A great source of annoyance in ordinary kilns arises from the fact that the heat sometimes gets too high, and melts the more fusible ores, thereby forming what are known as clinkers. The same difficulty is often encountered also in the roasting-process known as "heaps."

These clinkers are in a worse condition for reduction in the furnace than raw ores, and have a bad effect upon the smelting-operation.

Steam, by supplying such a large quantity of oxygen for oxidizing the ores, and affording at the same time hydrogen, which, at the temperature then existing, has a strong affinity for the damaging impurities in ores, sulphur, and phosphorus, forming with them volatile compounds, very greatly expedites the process of roasting or oxidizing, and does it much more thoroughly than is possible by the common process of heat and air.

The process of soaking the ores in salt water is also a material aid in preparing the ores for fusion. For very compact ores, this water should contain about thirty-seven per cent. of chloride of sodium, and for very porous ores about three per cent. of said chloride is sufficient. The quantity used in all cases should range between these two extremes, and adapted to the density of the ores.

By this process the salt is uniformly distributed in minute crystals through the body of the ore, making it fusible, and adding materially to the yield of metal therefrom. This process also reduces the point of fusion to a lower degree of heat, and thereby economizes fuel.

It is a well-known fact that chlorine possesses a strong affinity for iron and other metals. At the moment of fusion the chlorine leaves the sodium, and combines with the fused metal, and in so doing expels all traces of sulphur and phosphorus which the metal may have absorbed from the fuel or flux. The sodium oxidizes and combines with the slag, making it more fluid, and thus giving freer passage to the molten metal, which always settles below the slag in the hearth of the furnace.

We sometimes charge the water with chlorine-gas, and keep the receiver or box covered, to exclude the light.

The process of covering the ores with clay is recommended for the reasons following, namely:

It is well known to practical assayers, that in the presence of alumina, salt bears a high and long-continued heat before it volatilizes. This coating of clay, or alumina-bath, is designed to prevent salt from being expelled by heat before the ore reaches the zone of fusion. Besides, alumina properly distributed in the stock of the furnace improves the quality of the metal, iron, and perhaps other metals. This alumina-bath is valuable both for metals roasted and unroasted.

The box-receivers and dumping-apparatus are intended for both the front and rear of a kiln, and we usually construct the water-boxes in the ovens with movable slides, to shut off the steam when desirable, and we also usually supply a valve for the escape-pipe leading the steam to the open air.

What we claim as our invention, and desire to secure by Letters Patent, is—

1. The water-boxes $c$, constructed and operating substantially as and for the purposes described.

2. The escape-pipes $d$, in combination with the water-boxes $c$, when arranged and operating as herein specified.

3. The lifting-pans $u$ and $s$, in combination with the boxes in which they sit, and the lifting and dumping-apparatus therewith connected, when constructed and operating substantially as described.

4. The process herein shown and described for saturating ores with salt water, and coating them with clay, for the uses and purposes specified.

In testimony that we claim the above, we have hereunto subscribed our names, in the presence of two witnesses.

JAMES M. ROHRER.
JNO. H. BASSLER.

Witnesses:
  A. G. MANWILLER,
  HENRY WERNTZ.